United States Patent [19]
Zuercher et al.

[11] 3,915,290
[45] Oct. 28, 1975

[54] COOPERATING CONVEYOR CHAINS

[75] Inventors: Warren H. Zuercher, Cottage Grove; Frank David Evans, Eugene, both of Oreg.

[73] Assignee: Kimwood Corporation, Cottage Grove, Oreg.

[22] Filed: May 4, 1973

[21] Appl. No.: 357,264

[52] U.S. Cl. ................................ 198/162; 198/190
[51] Int. Cl.² ........................................ B65G 15/14
[58] Field of Search ............. 198/162, 165, 75, 190; 267/34

[56] References Cited
UNITED STATES PATENTS

| | | | |
|---|---|---|---|
| 1,746,697 | 2/1930 | Eaglesfield | 198/162 |
| 2,009,248 | 7/1935 | Bauer et al. | 198/162 UX |
| 2,387,446 | 10/1945 | Herz | 198/162 |
| 2,546,476 | 3/1951 | Schefe | 198/162 |
| 2,736,425 | 2/1956 | Fisk | 198/162 |
| 2,767,829 | 10/1956 | Hallden | 198/162 |
| 2,914,143 | 11/1959 | Focht | 267/34 X |
| 2,915,171 | 12/1959 | Peck | 198/162 |
| 3,143,269 | 8/1964 | van Eldik | 198/162 X |
| 3,258,110 | 6/1966 | Pilcher | 198/162 |
| 3,386,565 | 6/1968 | Carter | 198/162 |
| 3,521,322 | 7/1970 | Michael et al. | 198/165 X |
| 3,595,551 | 7/1971 | Ortheil | 267/34 X |
| 3,618,927 | 11/1971 | Nicholls | 267/34 X |

*Primary Examiner*—Evon C. Blunk
*Assistant Examiner*—Richard K. Thomson
*Attorney, Agent, or Firm*—Kolisch, Hartwell, Dickinson & Stuart

[57] ABSTRACT

An article conveyor for carrying articles along a path with the center line of each article maintained substantially on a preselected datum plane extending in the direction of the path. A pair of endless, elongated, opposed, power-driven conveyor chains are positioned with their article-engaging reaches extending along opposite sides of the path. These reaches of chain are yieldably biased toward the datum plane with substantially equal force so that an article carried therebetween will urge the opposed reaches of chain substantially equal distances from opposite sides of the datum plane. An article conveyed along the path by powered movement of the chains thus is supported with its center line substantially at the datum plane, regardless of the thickness of the article.

4 Claims, 5 Drawing Figures

1

COOPERATING CONVEYOR CHAINS

BACKGROUND OF THE INVENTION

This invention relates to apparatus for conveying articles along a path. More particularly, it relates to apparatus which is operable to convey articles along a path with the center line of each article maintained substantially on a preselected datum plane extending in the direction of the path.

There are many operations in which it is desirable to convey articles along a path with the center line of each article maintained substantially on a preselected datum plane extending in the direction of the path. Such an operation may be found where lumber or wood panels are produced. In such operations opposed sanding belts or rotating cutter heads may be disposed on opposite sides of a path along which the lumber or panel is conveyed. The spacing between the belts or cutter heads determines the thickness to which the lumber or panel is cut. It has been found that with center line feeding (the ability to maintain the longitudinal center line of a board or panel at a selected datum plane midway between the opposed belts or cutter heads) both belts or cutter heads may operate to remove the same amount of material from opposite sides of the board or panel at the same time. This increases the speed at which material may be removed from opposite sides of the workpiece and minimizes the maintenance requires for the apparatus, since both belts, or cutters, do substantially equal work.

In most previously known apparatus, however, workpieces have been fed to the belts or cutter heads with one surface, as opposed to the center line, of each piece carried along a common plane. Thus, thicker pieces required that one belt or cutter head perform the major portion of the work, while thin material often was cut thinner than necessary.

A general object of the present invention is to provide novel apparatus for conveying articles along a path with the center line of each article maintained substantially on a preselected datum plane extending in the direction of the path. Such centerline feeding is of particular advantage where it is desired to convey a workpiece between opposed cutters so that substantially equal quantities of material may be removed from opposite sides of the workpiece.

More specifically, an object is to provide such apparatus which includes power-driven article-engaging members on opposite sides of the datum plane, which members are yieldably biased against opposite sides of an article passed therebetween. The article-engaging members are biased with substantially equal force against the opposite sides of the article, whereby when an article passes therebetween the article-engaging members move substantially equal distances to opposite sides of the datum plane to maintain the centerline of the article on the datum plane.

Another object is to provide novel conveying apparatus in which a power-driven, article-engaging member is urged with substantially constant pressure against the surface of the article conveyed, thus to assure positive gripping and drive of the article therethrough.

Still another object is the provision of novel article-conveying apparatus which includes power-driven conveyor elements which are so mounted that they automatically adjust to conform to irregularities in the shape of an article conveyed, while still maintaining the article in a substantially centered feed path.

Yet another object is to provide such novel apparatus for conveying articles of differing thickness along a path, which includes opposed banks of power-driven article-engaging members disposed in side-by-side relationship. One bank is supported on one side of a preselected datum plane extending in the direction of the path and the other bank is supported on the opposite side of the datum plane. Each article-engaging member in a bank is yieldably biased toward the datum plane independently of the other members in the bank and is in directly opposed facing relationship with another article-engaging member in the opposite bank. With such construction, a plurality of articles, such as boards, can be fed through the apparatus in edge-to-edge abutting relationship with their centerlines maintained at a preselected datum plane even though there may be substantial variation in the thicknesses, or shapes, of the boards. This is a decided advantage in feeding material to wide-belt sanders, or planers, where the width capacity of the machine greatly exceeds the width of any single piece of lumber to be fed therethrough. In this way, the full capacity of the machine may be utilized, resulting in increased linear productivity and decreased machine maintenance.

DRAWINGS

These and other objects and advantages will become more fully apparent as the following description is read in conjunction with the drawings, wherein.

DETAILED DESCRIPTION OF AN EMBODIMENT OF THE INVENTION

Figure 1:
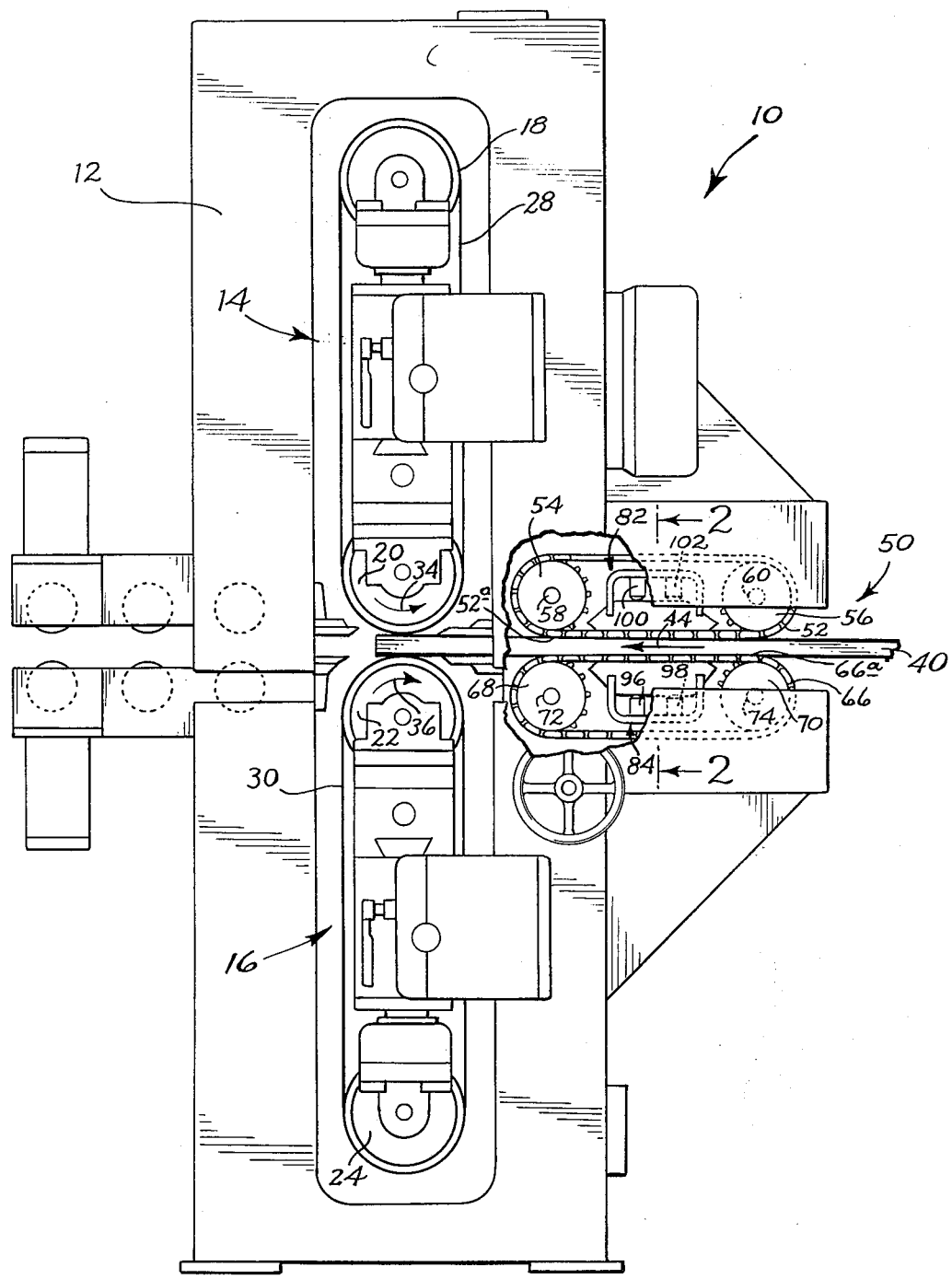
FIG. 1 is a side elevation view of a wide belt sanding machine including conveying, or feeding, apparatus according to an embodiment of the invention.

Referring now to the drawings, and first more particularly to FIG. 1, at 10 is indicated generally a wide belt lumber sanding machine. The machine includes an upright support frame 12 on which are mounted a pair of opposed belt sanders 14, 16. Sander 14 includes a pair of vertically spaced, elongated, power-rotated drums 18, 20, and sander 16 includes a pair of vertically spaced, elongated, power-rotated drums 22, 24. Drums 18, 20, 22, and 24 are all mounted for rotation about parallel, horizontal axes. An elongated, endless, wide, abrasive belt 28 is trained over drums 18, 20, and another endless, elongated wide abrasive belt 30 is trained over drums 22, 24.

The sanders are vertically adjustable on frame 12, whereby the spacing between drums 20, 22 may be selectively varied and then secured. The drums and belts are driven under power in the directions of arrows 34, 36. Opposite sides of a board, or panel, such as that indicated generally at 40, conveyed along a path in the direction indicated by arrow 44, to the left in FIG. 1, between the abrasive belts are abraded thereby. This may be either to provide smooth surfaces, or to reduce the size of the board.

Apparatus for conveying such a board, or panel, through the sanders is indicated generally at 50 in FIG. 1. The conveyor includes an upper bank of endless, elongated roller chains, such as that indicated generally at 52. The chains are disposed in side-by-side relationship and are trained at their opposite sets of ends over sprockets, such as those indicated generally at 54, 56. Sprockets 54, 56 are secured to substantially parallel, horizontally disposed, power-driven shafts 58, 60, respectively.

A lower bank of endless, elongated roller chains, such as that indicated generally at 66, are disposed in side-by-side relationship below chains 52. Chains 66 are trained adjacent their opposite sets of ends over spaced sprockets 68, 70. Sprockets 68, 70 are secured to substantially parallel, horizontally disposed power-rotated shafts 72, 74, respectively. The rotational speed of the shafts and sprockets are synchronized so that opposed reaches of chains 52, 66 are moved under power, to the left in FIG. 1, at substantially the same speed.

Figure 2:
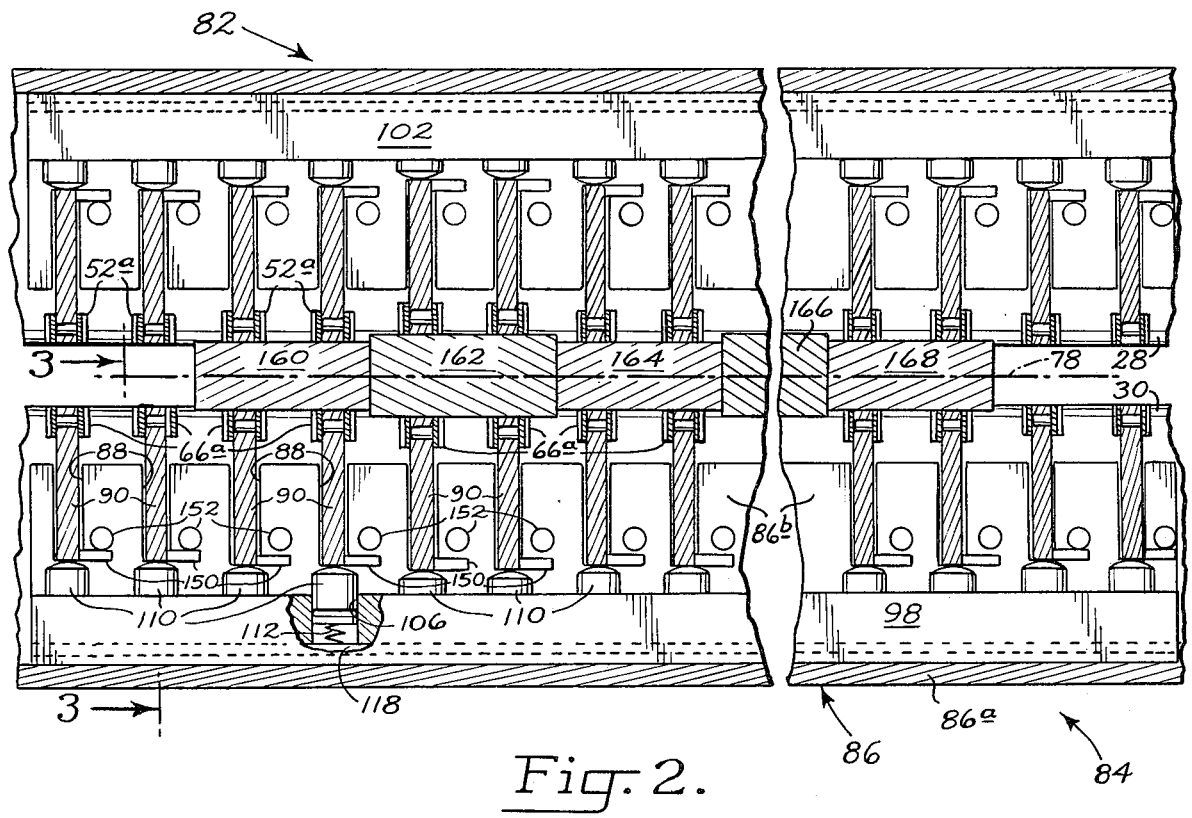
FIG. 2 is an enlarged cross-sectional view of the conveying apparatus taken generally along the line 2—2 in FIG. 1.
Figure 3:
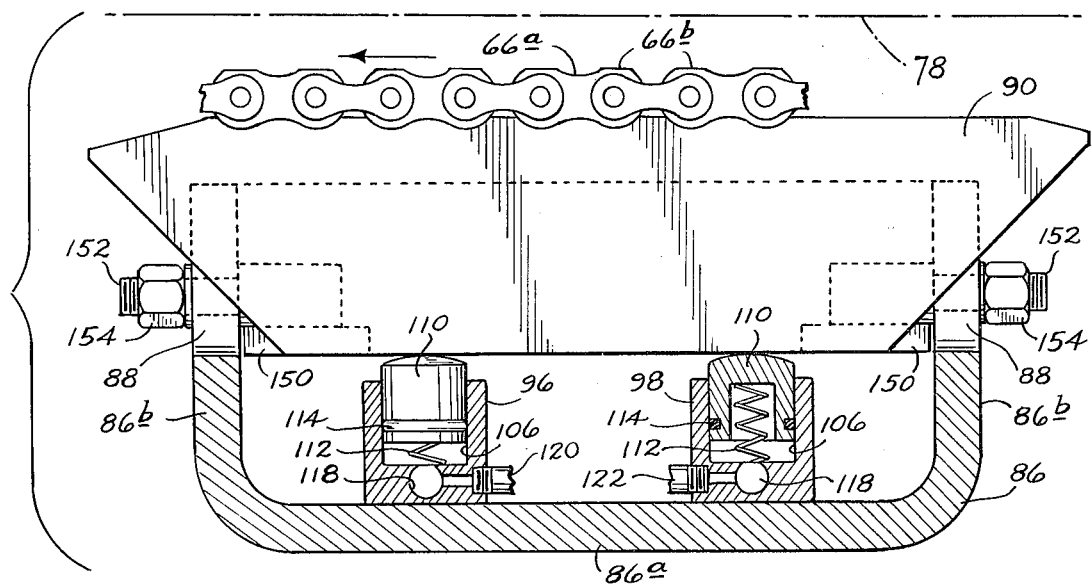
FIG. 3 is an enlarged cross-sectional view taken generally along the line 3—3 in FIG. 2.

Referring now to FIG. 2, an edge of an imaginary datum plane is illustrated generally at 78 as a dot-dash line. The plane extends substantially horizontally, midway between belts 28, 30 in the direction of the path along which a board is to be conveyed through the sander. Chains 52 in the upper bank are disposed with their lower reaches, indicated generally at 52a, extending substantially parallel to, or in the direction of, the path along which a board is to be conveyed, and above, or to one side of, datum plane 78. Chains 66 of the lower bank are disposed with their upper reaches 66a extending substantially parallel to, or in the direction of, the ath along which a board is to be conveyed, and below, or to the opposite side of the datum plane, from reaches 52a. As is best seen in FIG. 2, each of reaches 52a of an upper chain is disposed in directly opposed, facing relationship with a reach 66a of a lower chain. As seen in FIG. 3, rounded edges of outwardly facing portions of the chains are ground to a flatter configuration, as illustrated at 66b, to provide a greater contact surface for engaging a board conveyed therethrough.

Reaches 52a of the upper bank of chains and reaches 66a of the lower bank of chains are supported by and yieldably biased toward datum plane 78 by support devices indicated generally at 82, 84. The support devices are similar in construction and, thus, only device 84 supporting reaches 66a of chain 66 will be described in detail. Although the construction of the support devices are similar, device 82 is inverted relative to device 84.

Describing support device 84, it includes an elongated, substantially U-shaped, channel 86 having a horizontally disposed web 86a and opposed, laterally spaced, upright flanges 86b, 86c. The channel has a length substantially equal to the width of abrasive belts 28, 30, as is best seen in FIG. 2. A plurality of equally spaced upright grooves 88 are formed in flanges 86b, 86c. Each of grooves 88 in one of the flanges is disposed in directly opposed alignment with a groove in the opposite flange.

A plurality of elongated, upright, support plates, also referred to as guide members, 90 are loosely received in notches 88 and are shiftable vertically therein toward or away from datum plane 78. As is best seen in FIGs. 2 and 3, the upper elongated edge, also referred to as a support or guide surface, of a plate 90 supports reach 66a of a chain 66.

Supported on web 86a of channel 86 and underlying plates 90 are a pair of elongated, parallel manifolds, or manifold blocks, 96, 98. A similar pair of elongated manifolds 100, 102 (seen in end view in FIG. 1 and schematically in FIG. 4) are provided in the upper support device 82.

Each of manifolds 96, 98 has a plurality of upright, open-top cylinders 106 formed therein, with each cylinder 106 positioned beneath a plate 90. A piston 110 is mounted for reciprocation in each of cylinders 106 for vertical extension and retraction relative to the manifold, with its outermost end engaging the underside of a plate 90. As is seen in FIG. 3, the pistons in manifold 96 engage the guide plates adjacent one set of their ends and the pistons in manifold 98 engage the guide plates adjacent their opposite set of ends.

Compression springs 112 are disposed between each of pistons 110 and the base of its associated cylinder 106. Each spring is operable yieldably to urge the piston, a plate 90, and their associated reach of chain toward datum plane 78. All of springs 112 in support devices 82, 84 have substantially the same spring rate. Thus, a reach of chain in the upper bank will be urged toward the datum plane with substantially the same force as the reach of chain directly opposite it in the lower bank, if they are displaced an equal distance to opposite sides of the datum plane. Further, with a plate 90 being supported adjacent its opposite ends by independent springs, as seen in FIG. 3, the opposite ends of the plate are able to shift toward or away from the datum line independently of each other to allow for irregularities in thickness or shape of an individual board carried thereover.

A sealing ring 114 provides a substantially fluid-tight seal between piston 110 and its associated cylinder 106. Elongated horizontal bores, or conduits, 118 extend the length of manifolds 96, 98 and communicate with each of cylinders 106. A pair of fluid supply conduits 120, 122 are connected in fluid communication with bores 118 of manifolds 96, 98, respectively, and a pair of conduits 124, 126 (see FIG. 4) are connected to similar bores in manifolds 100, 102 for the upper bank of chains.

Conduits 120, 122, 124, 126 are connected to a common source of fluid under pressure indicated generally at 130. The pressure fluid source, shown schematically in FIG. 4, includes a pump 132 which supplies fluid through a pressure regulating valve 133, at a preselected pressure to one end of a pressure multiplier 134. Multiplier 134 includes a pair of end-to-end connected cylinders 136, 138 of unequal cross section, with 138 being smaller than 136. A pair of piston heads 140, 142 in cylinders 136, 138, respectively, are rigidly interconnected to each other by a rod 146.

Figure 4:
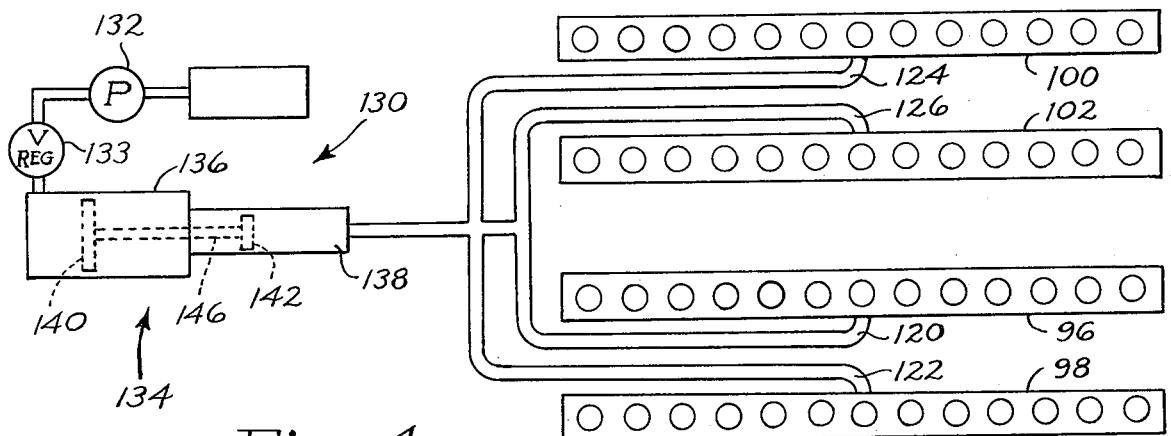
FIG. 4 is a schematic view illustrating the supply of pressure fluid to banks of cylinders within the apparatus.

Fluid supplied to the left end of cylinder 136 at a preselected pressure will urge the piston heads and rods to the right in FIG. 4. Due to the unequal cross sections of the cylinders, pressure fluid enclosed in the system in the right end of cylinder 138 and conduits 120, 122, 124, 126 will be raised to a proportionally greater pressure than that introduced to the left end of cylinder 136.

Since manifolds 96, 98, 100, 102 are connected to a common source of pressure fluid, their associated pistons 110 will urge the opposed reaches of chains toward datum plane 78 with substantially equal forces.

Referring to FIGS. 2 and 3, secured to and projecting laterally outwardly from each end of each of plates 90 is a stop plate 150. Associated with each of plates 150 is an elongated bolt 152 which is screwed into an accommodating threaded bore in a web of channel 86 and is locked in place by a lock nut 154. Bolts 152 and stop plates 150 limit the movement of plates 90 and their associated reaches of chains toward datum plane 78 when a workpiece is not disposed therebetween. Further, plates 150, by engaging flanges 86b, 86c of channel 86, serve to limit upstream and downstream movement of plate 90.

Explaining the operation of the apparatus, boards of unequal, and possibly irregular thickness and cross section, such as those illustrated in cross section at 160, 162, 164, 166, 168 in FIG. 2, may be fed either individually, or in charges of multiple lumber pieces in edge-to-edge abutting relationship, through conveyor apparatus 50 and toward the sanding belts. As the conveyor chains are driven, with reaches 52a, 66a moving at the same speed toward the sanding belts, boards fed therebetween are engaged on their upper and lower sides by oppositely disposed chain reaches 52a, 66a. Since these reaches of chains are biased toward datum plane 78 with substantially equal force from opposite sides of the board by springs 112 and pistons, or rams, 110, each board will be carried with its longitudinal center line maintained substantially on datum plane 78, as illustrated in FIG. 2, regardless of its thickness.

Explaining further, since the spring rates for the springs biasing the upper and lower reaches of chain toward each other are the same, a unit displacement of one reach of chain away from the datum plane due to the thickness of a board will produce a substantially equal displacement of the oppositely disposed reach of chain away from the datum plane. In this manner, eeach board is substantially centered between the opposed sanding belts as it is fed thereto, whereby belts 28, 30 may remove substantially equal amounts of material from opposite sides of each board.

With such construction, one belt does not have to perform a disproportionate share of the work in abrading the material, as would be required if material were to be fed thereto with one face of each board positioned on a preselected plane, rather than by way of such center line feeding.

With all of pistons 110 connected to a common source of fluid pressure the article-engaging reaches of the chains will grip boards conveyed therethrough with a relatively constant and uniform preselected force. Varying the fluid pressure supplied to manifolds 96, 98, 100, 102 will vary the force with which the chains grip the boards. This is an important feature also. If the boards being worked are hardwood, the sanding belts must operate in such a manner that a substantial force is applied to the boards which urges them back toward the conveyor. If the chains grip such boards too lightly the chains may slip and not be able to force them through the abrading region between the sanding belts. Whereas, if the boards being worked are softwood the chains must not grip too tightly or they may mar the surfaces of the boards. By being able to vary the pressure of fluid supplied to the manifolds the proper gripping force may be applied.

As has been mentioned, individual boards may not be totally straight, in that they may be twisted, cupped, bent, or have a tapered cross section or thickness. Since each board generally is gripped between multiple pairs of reaches of chains, each of which reaches is independently biased adjacent its opposite ends relative to the other reaches of chains, the apparatus can accommodate such irregularities in the shapes of the boards. In operation each reach of chain thus is able to deflect independently of the other chains to accommodate such irregularities while maintaining each board substantially centered relative to the sanders or cutter heads.

With the centerline feeding which may be produced by this apparatus, a thin board, which is thinner than the space between the opposed sanding belts or cutter heads, need not be made thinner as may occur in apparatus where the boards are indexed along one side.

The specific features of the invention dealing with the combination spring and hydraulic support for an article-engaging member, however, may be used to advantage also in apparatus where boards are indexed along only one side. The spring and hydraulic support combination provide means for quickly changing the gripping pressure applied to a board as desired. Once the selected gripping force has been attained it is maintained substantially constant and uniform throughout operation of the apparatus.

The use of synchronously driven chains assures that each article will be conveyed at substantially the same speed through the operation.

Figure 5:
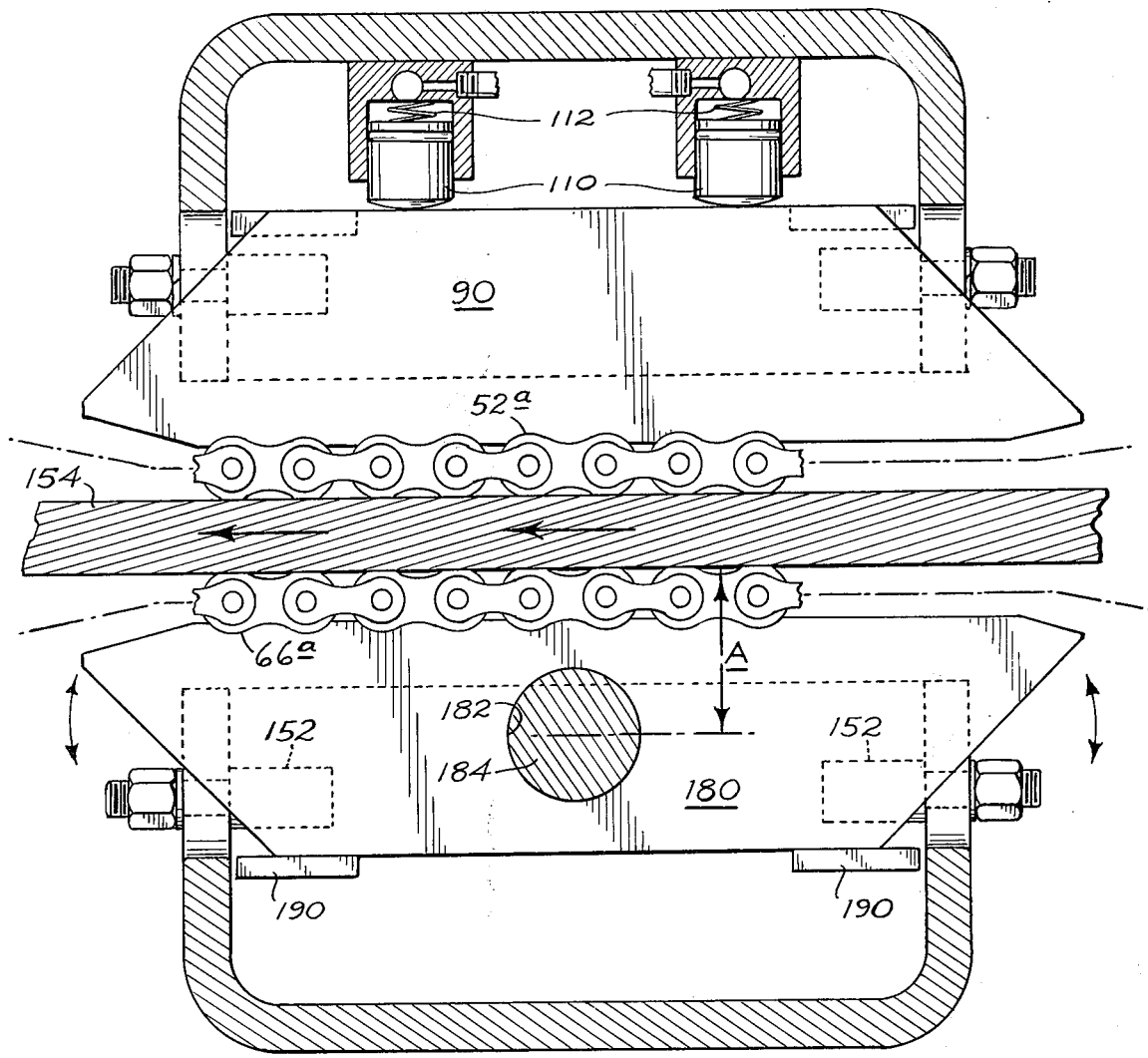
FIG. 5 is a cross-sectional elevation view of a portion of a modified embodiment of apparatus according to the invention.

Referring to FIG. 5, the apparatus may be modified as illustrated to permit plane feeding of articles wherein one side of each of the articles is maintained on a preselected datum plane, as opposed to center line feeding, discussed previously, wherein the longitudinal centerlines of articles are maintained on a preselected datum plane. As illustrated in FIG. 5, the support plates, or guide members, 90 in a bank on one side of the path along which an article, such as a board, is to be conveyed are yieldably biased toward the path. As previously described such yieldable biasing is produced by pressure-fluid-operated pistons 110 in manifold blocks, with springs 112 interposed between the pistons and bases of the manifold blocks. These pistons and plates 90 in the upper bank yieldably bias reaches 52a of their associated set of chains 52 toward the path.

Reaches 66a of the lower set of chains 66, on the opposite side of the path, are supported on a bank of laterally-spaced, substantially parallel, side-by-side, elongated support plates, or guide members, such as that indicated generally at 180. Each of plates 180 has a bore 182 extending therethrough in a region intermediate its ends. An elongated shaft 184, extending laterally of the reaches of chain and parallel to channel 86, extends loosely through bores 182 in the plates in the lower bank. The shaft is secured adjacent its opposite ends to channel 86, and thus is maintained a preselected distance A from the path of articles conveyed by the apparatus.

Support plates 180 thus are pivotally mounted intermediate their ends on shaft 186. The shaft provides a pivot axis maintained a substantially constant distance from the path about which a support plate may rock, with opposite ends of the plate being movable toward and away from the path while the intermediate region of the upper surface of the plate is maintained substantially on a preselected datum plane.

Stop plates 190 are secured to the lower edges of opposite ends of each support plate 180 and project laterally outwardly from one side of the plate. Each stop plate is positioned to engage an associated bolt 152 projecting thereover to limit movement of its end of the plate toward the path.

In operation of the apparatus illustrated in FIG. 5 for plane feeding, a board indicated at 154 is carried along the path by movement of the conveyor chains with the side of the board facing chains 66 traveling along a path which is controlled by the position of guide plates 180. Opposite ends of each plate 180 are free to pivot about shaft 182, while the central region of the upper surface of each plate 180 is maintained on a preselected plane. Guide plates 90 are yieldably biased as their opposite ends toward the path with substantially equal force to hold the board against chains 66. With such construction and operation the apparatus will accommodate irregularities of shape or thickness of boards passed therethrough while maintaining the surface of the board facing chains 66 on substantially a predetermined datum plane.

While a preferred and a modified embodiment of the invention have been described herein, it should be apparent to those skilled in the art that variations and modifications are possible without departing from the spirit of the invention.

It is claimed and desired to secure by Letter Patent:

1. Apparatus for conveying charges of lumber, including charges having different thickness pieces arranged side-by-side, along a path with the center lines of the pieces substantially on a preselected datum plane extending in the direction of said path, comprising a first bank of endless, elongated conveyor chains disposed side-by-side, each chain having an article-engaging reach extending substantially parallel to and along one side of said path, free to shift toward and away from said path independently of the other chains in said first bank, a second bank of endless, elongated conveyor chains disposed side-by-side, each chain having an article-engaging reach extending substantially parallel to and along one side of said path, free to shift toward and away from said path independently of the other chains in said second bank, each of said reaches in said second bank being disposed directly opposite a corresponding reach in said first bank, drive means operatively connected to said banks of chains for driving the article-engaging reaches of the chains at substantially the same speed in the direction of said path, support means supporting each of said reaches independently of the other reaches in its associated bank of chains for independent movement toward and away from said datum plane to accommodate articles of different thickness between oppositely disposed reaches, and biasing means yieldably biasing the oppositely disposed reaches toward each other with substantially equal force to engage opposite sides of articles disposed therebetween and providing substantially equal spacing of said oppositely disposed reaches from said datum plane.

2. The apparatus of claim 1, wherein said biasing means for a bank of chains comprises a plurality of fluid-pressure-operated rams, each of which is operatively connected to one of said article-engaging reaches of chain in such a manner that with fluid under pressure supplied thereto it yieldably urges its associated reach of chain toward an oppositely disposed reach of chain in the other bank independently of the other chains in said bank.

3. The apparatus of claim 1, wherein said biasing means for a bank of chains comprises an elongated manifold block extending transversely of the article-engaging reaches of said chains on the sides of said reaches opposite said path, said manifold block having a plurality of cylinders defined therein, a plurality of pistons mounted in said cylinders for reciprocation toward and away from said path, each piston being operatively connected to an article-engaging reach of chain whereby movement of one produces movement of the other, means defining a conduit in said manifold block communicating with said cylinders for supplying pressure fluid to the sides of the pistons which will urge them and their associated reaches of chain toward said path, and pressure fluid supply means connected to said conduit.

4. The apparatus of claim 1, wherein said biasing means for an oppositely disposed pair of chains in said banks comprises first spring means operatively connected to one of said reaches in the pair for biasing it toward the other of said reaches and second spring means operatively connected to the other of said reaches for biasing it toward said one reach, said first and second spring means having the same spring rate.

* * * * *